United States Patent
Watanabe et al.

(10) Patent No.: US 6,257,769 B1
(45) Date of Patent: Jul. 10, 2001

(54) OPTICAL WAVEGUIDE COMPONENT

(75) Inventors: Tomohiro Watanabe; Katsuhiko Iwashita; Toshihiko Ota, all of Ichihara; Kazunori Watanabe, Sanjo; Masaaki Takaya; Shinji Nagasawa, both of Mito, all of (JP)

(73) Assignees: The Furukawa Electric Co., Ltd.; Nippon Telegraph and Telephone Corporation, both of Tokyo (JP)

( * ) Notice: Subject to any disclaimer, the term of this patent is extended or adjusted under 35 U.S.C. 154(b) by 0 days.

(21) Appl. No.: 09/491,200

(22) Filed: Jan. 25, 2000

(30) Foreign Application Priority Data

Jan. 26, 1999 (JP) .................................................. 11-017695

(51) Int. Cl.⁷ ..................................................... G02B 6/36
(52) U.S. Cl. ................................ 385/53; 385/49; 385/50; 385/59; 385/80
(58) Field of Search ................................ 385/53, 55, 56, 385/59, 60, 65, 71, 83, 49, 50, 51, 52, 14, 80

(56) References Cited

U.S. PATENT DOCUMENTS

| | | | |
|---|---|---|---|
| 5,717,800 | * | 2/1998 | Funabashi ............................. 385/49 |
| 5,867,621 | * | 2/1999 | Luther et al. .......................... 385/59 |
| 6,045,270 | * | 4/2000 | Weiss et al. ........................... 385/59 |
| 6,095,695 | * | 8/2000 | Ohtsuka et al. ........................ 385/72 |

FOREIGN PATENT DOCUMENTS 0 514 722 A1    11/1992   (EP) .

OTHER PUBLICATIONS

"Compact Demountable Optical Coupling Between Single–Mode Planar Waveguides and Multifiber", Optical Fiber Communications, Society of America, Washington, D.C., U.S.A.

* cited by examiner

Primary Examiner—Hemang Sanghavi
(74) Attorney, Agent, or Firm—Frishauf, Holtz, Goodman, Langer and Chick, P.C.

(57) ABSTRACT

An optical waveguide component includes an optical waveguide chip formed with an optical waveguide, first and second connecting end members mounted on opposite end portions of the waveguide chip, housings for protecting the waveguide chip, and first and second receptacles mounted to end faces of the housings. When optical connector plugs are inserted into connector-plug accommodation holes of the first and second receptacles, the connector plugs are adequately positioned in the connector-plug accommodation holes by means of a guiding function of these holes, so that guide pins projecting from tip end faces of the connecting end members are fitted into guide-pin accommodation holes formed in the connector plugs, whereby optical fibers held by the connector plugs and the waveguide of the waveguide component are connected accurately and easily.

3 Claims, 7 Drawing Sheets

(PRIOR ART) FIG. 1
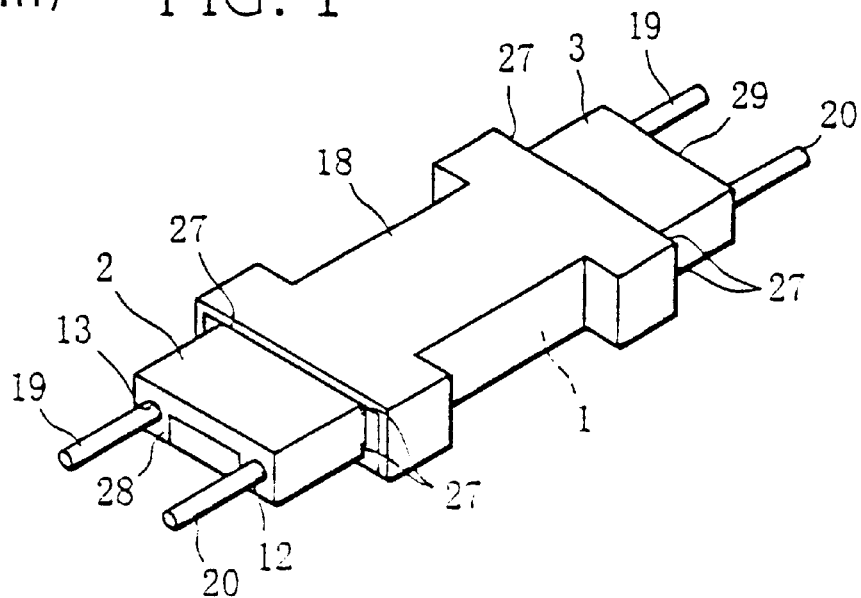
(PRIOR ART) FIG. 2
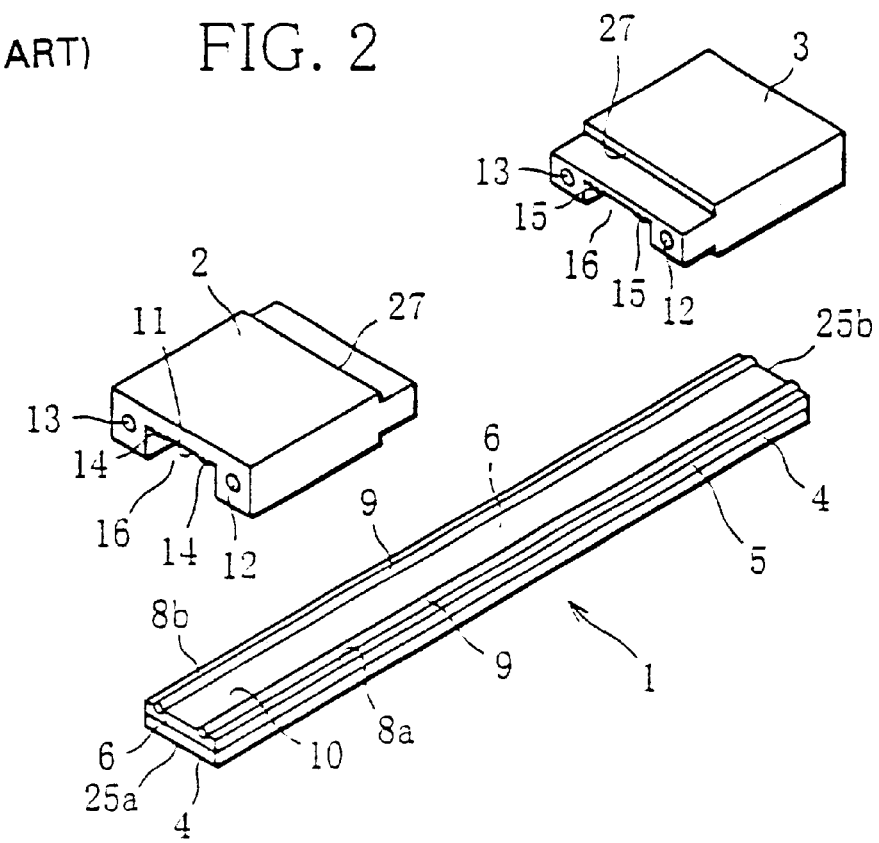

(PRIOR ART) FIG. 3
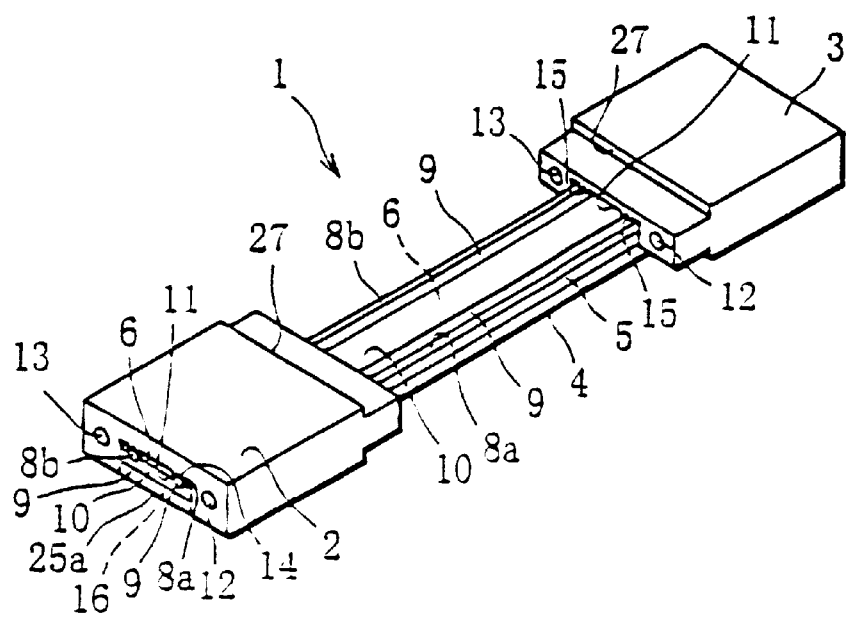
(PRIOR ART) FIG. 4
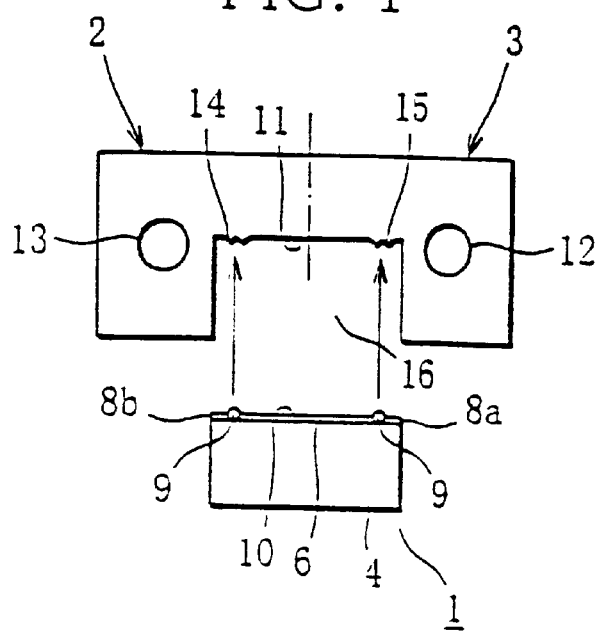

OPTICAL WAVEGUIDE COMPONENT

BACKGROUND OF THE INVENTION

1. Technical Field

The present invention relates to an optical waveguide component formed with an optical waveguide adapted to be connected to an optical fiber, and more particularly, to an optical waveguide component which facilitates an accurate connection between an optical waveguide formed in the waveguide component and an optical fiber formed in an optical connector plug.

2. Related Art

Optical waveguide components formed with optical waveguides are employed to construct an optical communication system. In general, an optical waveguide is connected at each of opposite end faces with a single fiber or multi fibers. A technical art for connecting an optical waveguide with optical fibers is known, in which an optical waveguide component and optical fibers are moved three-dimensionally relatively to one another and fixed together at their relative positions where a light beam output from an output-side optical fiber provides a maximum power when a light beam is input to an input-side optical fiber. However, the aforesaid alignment adjusting operation in this technique requires much time and labor.

To eliminate such an adjustment, another connecting technique is known, in which an optical waveguide component is connected to an optical connector plug with use of guide pins that are fitted into guide pin holes formed in both the waveguide component and the connector plug. According to this technique, an optical fiber connected in advance with the connector plug can be connected to an optical waveguide formed in the waveguide component, without the need of making a particular alignment operation.

In FIGS. 1–5, an optical waveguide component of this kind proposed by the present applicant is exemplarily shown. This optical waveguide component comprises an optical waveguide chip (waveguide component body) 1 formed with an optical waveguide pattern (more generally, one or more optical waveguides), and connecting end members 2, 3 respectively mounted on opposite ends of the waveguide chip 1. By connecting the connecting end members 2, 3 to optical connector plugs 23 to which respective one end portions of optical fiber ribbons 21 are connected, optical fibers of the optical fiber ribbons 21 are connected to the optical waveguide pattern of the waveguide component.

As best shown in FIG. 2, the waveguide chip 1 comprises an elongated plate-like substrate 4 on which a clad 5 and a core 6 embedded therein are formed longitudinally of the waveguide chip. A pair of positioning guides 9 are formed in an upper face of the waveguide chip 1 longitudinally thereof at locations just inside lateral edge portions 8a, 8b of the clad 5.

Each of the connecting end members 2, 3 is formed with a recess 16 in which a corresponding end portion of the waveguide chip 1 is closely received. As best shown in FIG. 4, two pairs of projecting strips are formed in a horizontal inner face 11 of the connecting end member at two corner portions of the recess 16. Two projecting strips forming each projecting-strip pair are laterally adjacent to each other and are each formed into a triangular shape in transverse cross section, thereby forming a positioning guide groove 14 or 15 therebetween.

By inserting one end portion of the waveguide chip 1 into the recess of the connecting end member 2 as shown in FIG. 4, the positioning guides 9 are fitted into the positioning guide grooves 14, whereby the one end portion of the waveguide chip 1 is positioned in the recess 16 and fixed to the connecting end member 2 in a state that a connecting end face 25a of the waveguide chip is exposed, by means of adhesive applied to the horizontal inner face 11 and vertical inner faces of the connecting end member 2. Similarly, another end portion of the waveguide chip 1 is fixed in the recess 16 of the connecting end member 3, with its connecting end face 25b exposed.

Next, opposite end portions of a protective member 18 are engaged with stepped portions 27 formed in outer faces of inner end portions of the connecting end members 2 and 3, whereby the assemblage of the waveguide component is completed (FIG. 1). Between the connecting end members 2 and 3, the upper and side faces of the waveguide chip 1 are surrounded and protected by the protective member 18.

Prior to connecting optical fiber ribbons 21 (FIG. 5) and the waveguide component, tip end portions of the optical fiber ribbons 21 are connected to optical connector plugs 23, and respective one halves of guide pins 19 and 20 are inserted into guide-pin fitting holes 12 and 13 formed in each connecting end member 2 or 3.

After the connector plugs 23 are disposed such that their tip end faces 30 oppose the tip end faces 28, 29 of the connecting end members 2, 3 and that through holes 22 formed in the connector plugs 23 are aligned with the guide pins 19, 20 projecting from the tip end faces of the connecting end members, the tip end portions of the guide pins 19, 20 of the connecting end members are inserted into the through holes 22 of the connector plugs 23, and the connector plugs 23 are moved toward the connecting end members until their connecting end faces 30 are brought in contact with the tip end faces 28, 29 of the connecting end members 2, 3. The connecting end faces 30 of the connecting end members and the tip end faces of the optical fiber ribbons 21 are disposed to oppose the tip end faces 28, 29 of the connecting end members and the connecting end faces 25a, 25b of the waveguide chip 1, respectively, through refractive-index matching agent applied in advance thereto.

Finally, engaging portions of spring clamps 24 are engaged with rear end faces of the connector plugs 23 and with stepped portions 31 of the protective member 18, so that each spring clamp 24 is bridged between a corresponding one of the connector plugs 23 and the waveguide component 1, whereby the connector plugs and the waveguide component are brought in axially urged contact with and fixed to one another.

According to the aforementioned optical waveguide component, an accurate connection between the waveguide pattern and the optical fibers can be achieved without a particular alignment operation, by simply connecting the waveguide component and the optical fiber ribbons 21 through the guide pins 19, 20 projecting from the end members 2, 3 and inserted into the through holes 22 formed in the connector plugs 23. In order to insert the guide pins 19, 20 into the through holes 22, however, the positioning of the connector plugs 23 relative to the connecting end members 2, 3 must be made precisely, and it is difficult for an operator to carry out a manual positioning operation accurately and promptly.

SUMMARY OF THE INVENTION

An object of the present invention is to provide an optical waveguide component capable of easily establishing an accurate connection between an optical waveguide formed in the optical waveguide component and an optical fiber formed in an optical connector plug.

In order to achieve the object, the present invention provides an optical waveguide component adapted to be connected to an optical connector plug through a guide pin. The optical waveguide component comprises an optical waveguide chip formed with an optical waveguide, a connecting end member mounted on a tip end portion of the optical waveguide chip and having a guide-pin fitting hole, a protective member for protecting the optical waveguide chip, and a receptacle connected to the optical connector plug and disposed on a tip end side of the protective member.

According to the optical waveguide component of this invention, by pushing an optical connector plug into a connector-plug accommodation hole of the receptacle of the waveguide component after a tip end portion of the connector plug is inserted into the connector-plug accommodation hole, the connector plug is guided by and is smoothly moved in the connector-plug accommodation hole toward a connecting end member of the optical waveguide component. As the connector plug is inserted deeply into the connector-plug accommodation hole, the longitudinal axis of the connector plug is brought to be more precisely aligned with the longitudinal axis of the connecting end member. In a state that the connector plug is sufficiently pressed into the connector-plug accommodation hole of the waveguide component, therefore, a guide-pin accommodation hole of the connector plug is satisfactorily aligned with the guide pin projecting from the tip end face of the connecting end member into the connector-plug accommodation hole of the receptacle. In particular, if the connector plug and the connector-plug accommodation hole are fabricated with high accuracy, the connector plug is precisely positioned in the connector-plug accommodation hole by simply pressing the connector plug into the connector-plug accommodation hole of the receptacle, whereby the guide pin of the connecting end member can be accurately and easily inserted into the guide-pin accommodation hole of the connector plug. The prior art waveguide component, having a connecting end member adapted to be directly connected to an optical connector plug, essentially requires much effort and time for manually positioning a guide-pin accommodation hole of the connector plug relative to a guide pin of the connecting end member and for fitting the guide pin into the guide-pin accommodation hole. On the contrary, the waveguide component of this invention can be accurately and promptly connected to a connector plug via guide pins without the need of such effort and time.

In the present invention, preferably, the optical waveguide component comprises first and second connecting end members respectively mounted on opposite end portions of the optical waveguide chip and each having a guide-pin fitting hole, and first and second receptacles disposed on both end face sides of the protective member and connected to first and second optical connector plugs, respectively.

With this preferred arrangement, the first and second connecting end members can be accurately and rapidly connected to the first and second optical connector plugs, and hence the connection between opposite end faces of the waveguide of the waveguide component and optical fibers can be made accurately and rapidly.

More preferably, protective members are provided at the tip end portions of the optical waveguide chip independently of each other.

With this preferred arrangement, positions of the first and second connecting end members, received in first and second protective members, relative to the first and second receptacles mounted to the first and second protective members are determined through the first and second receptacles. Therefore, the positioning accuracy of the guide-pin accommodation holes of the first and second connector plugs relative to the guide pins of the first and second connecting end members is improved, whereby the connection between the connector plugs and the connecting end members via the guide pins can be made accurately and promptly. Since the first and second protective members are independently of each other, the first and second protective members can be mounted to opposite end portions of the waveguide chip even if there is a warp in the waveguide chip, so that the waveguide chip may be protected by the first and second protective members, respectively.

BRIEF DESCRIPTION OF THE DRAWINGS

FIG. 1 is a perspective view showing by way of example a prior art optical waveguide component;

FIG. 2 is an exploded perspective view showing an optical waveguide chip and first and second connecting end members of the waveguide component shown in FIG. 1;

FIG. 3 is a perspective view showing the waveguide chip in a state where the first and second connecting end members thereof are respectively mounted on opposite end portions of the waveguide chip;

FIG. 4 is an end view showing the course of mounting the waveguide chip onto the first and second connecting end members, in which respective one halves of these members are illustrated on both sides of the centerline in FIG. 4;

DETAILED DESCRIPTION

With reference to FIGS. 6–20, an optical waveguide component according to an embodiment of the present invention will be explained.

The basic construction of the waveguide component of the present embodiment is substantially the same as that of the prior art waveguide component shown in FIGS. 1–5 which will be referred to in the following explanations. In FIGS. 6–20, elements similar to those shown in FIGS. 1–5 are denoted by like numerals and explanations thereof will be partly omitted. For convenience of illustrations, FIGS. 6–20 are partly inconsistent with one another in their details.

Figure 5:
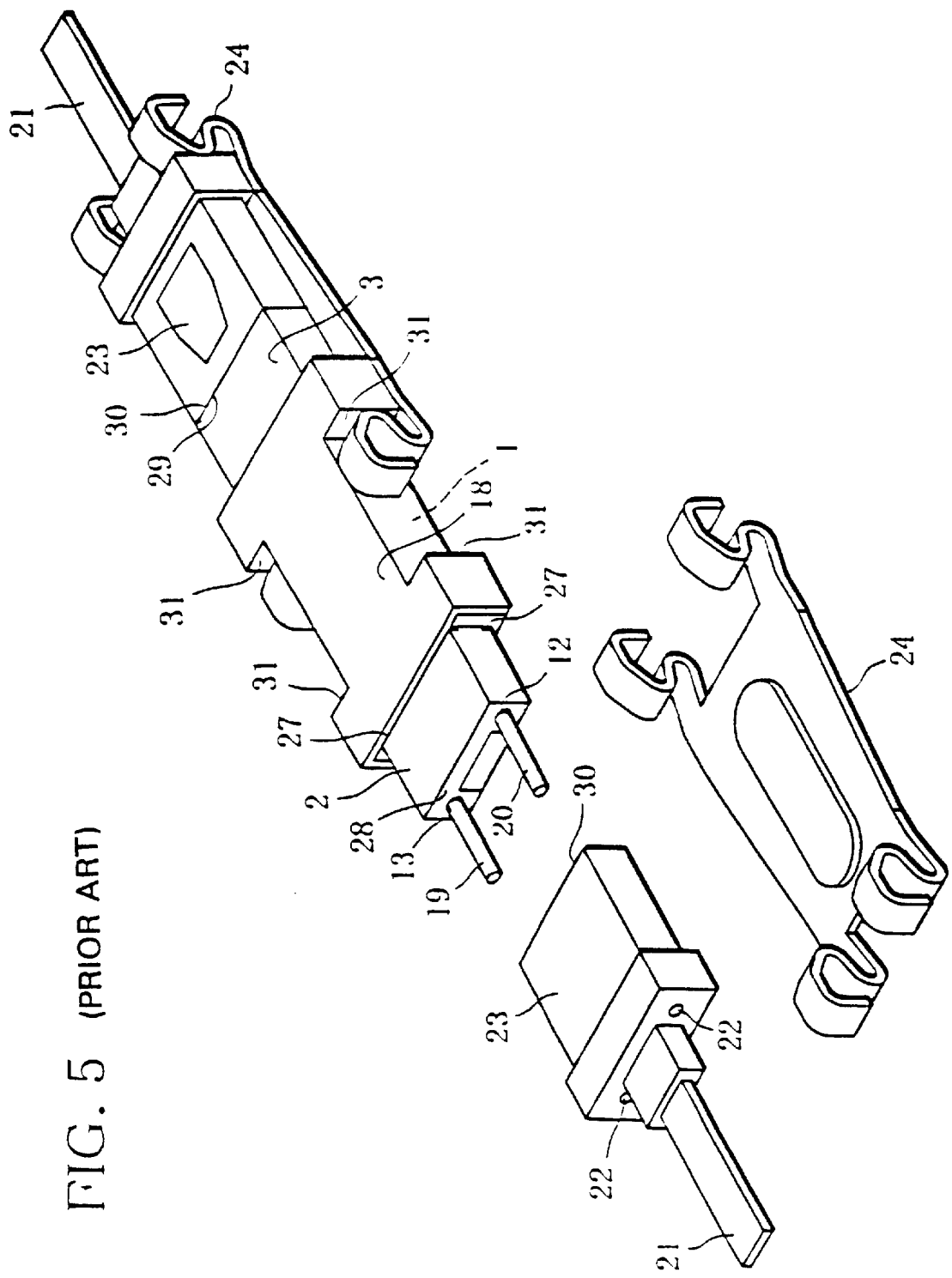
FIG. 5 is an exploded perspective view showing the course of connection between the waveguide component shown in FIG. 1 and optical fiber ribbons via optical connector plugs.
Figure 6:
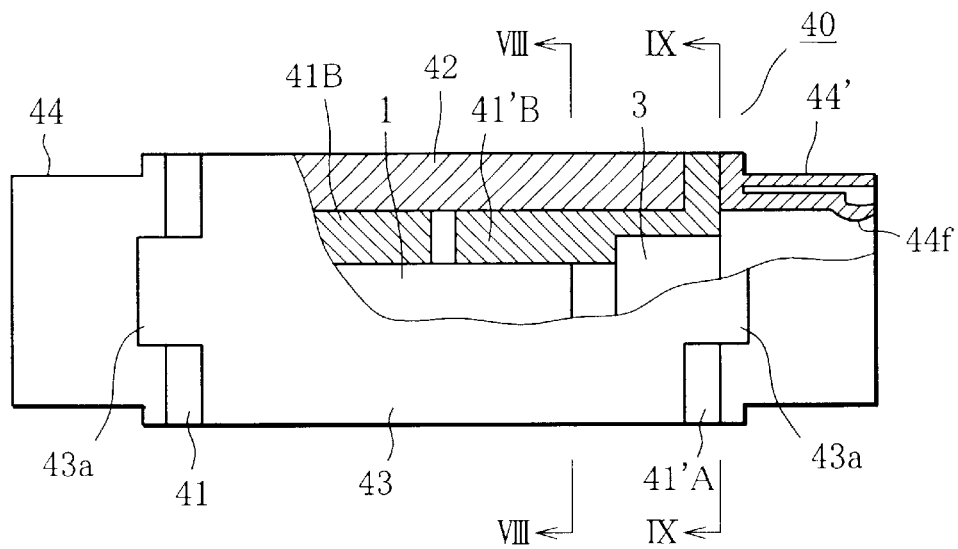
FIG. 6 is a sectional plan view showing, partly broken, an optical waveguide component according to an embodiment of the present invention.
Figure 7:
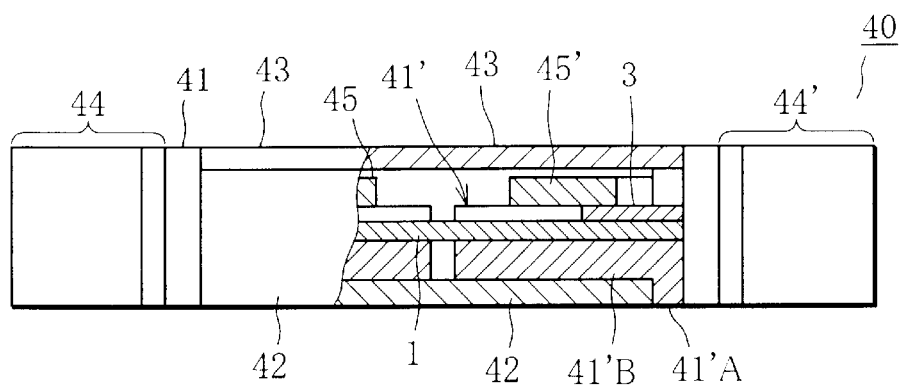
FIG. 7 is a sectional side view showing, partly broken, the waveguide component shown in FIG. 6.
Figure 8:
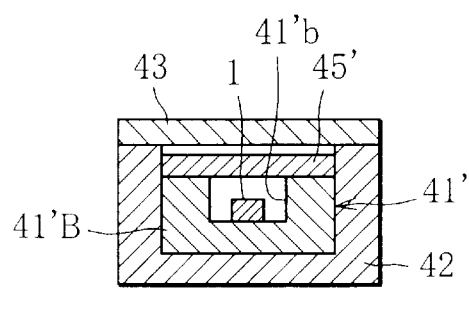
FIG. 8 is a traverse sectional view showing, partly broken, the waveguide component taken along line VIII—VIII.
Figure 9:
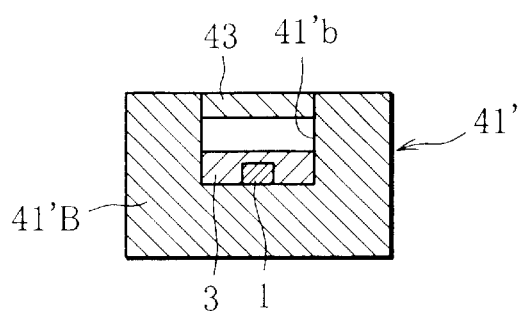
FIG. 9 is a traverse sectional view taken along line IX—IX.
Figure 10:
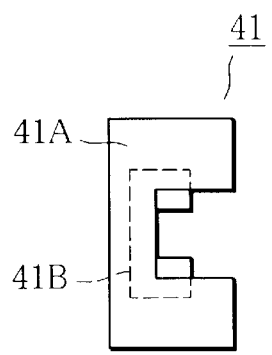
FIG. 10 is a front end view of a first housing serving as a protective member of the optical waveguide component.
Figure 11:
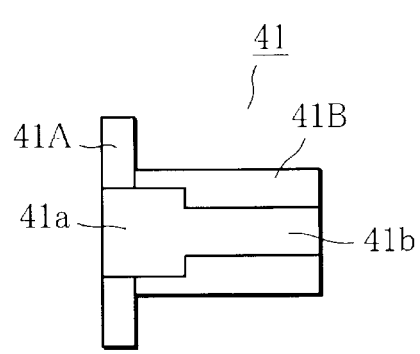
FIG. 11 is a plan view of the first housing shown in FIG. 10.
Figure 12:
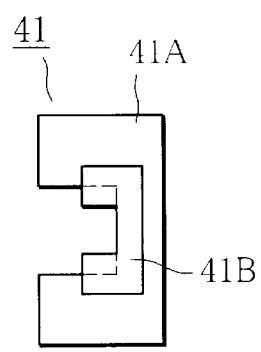
FIG. 12 is a rear end view of the first housing.
Figure 13:
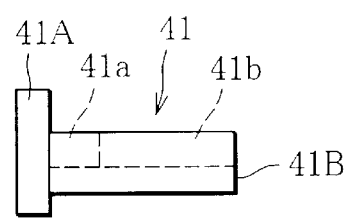
FIG. 13 is a side view of the first housing.
Figure 14:
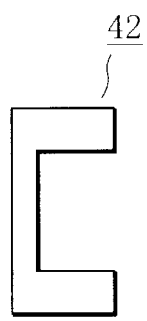
FIG. 14 is an end view of a protective cover.
Figure 15:
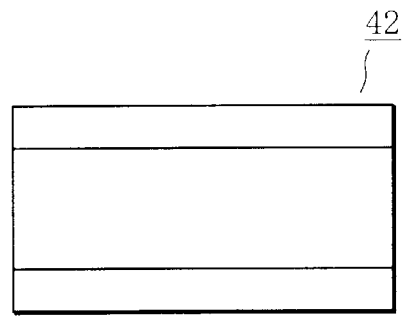
FIG. 15 is a plan view of the protective cover.
Figure 16:
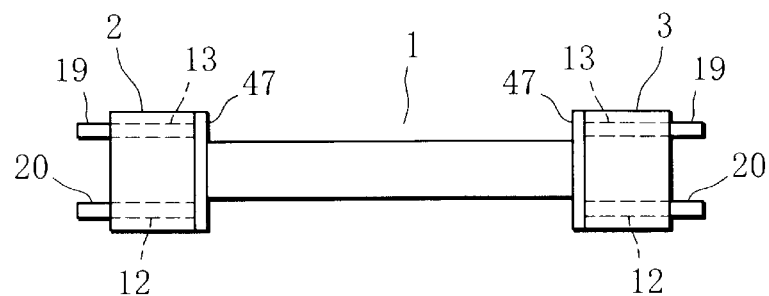
FIG. 16 is a schematic plan view showing the optical waveguide chip and the first and second connecting end members of the optical waveguide component shown in FIG. 6.
Figure 17:
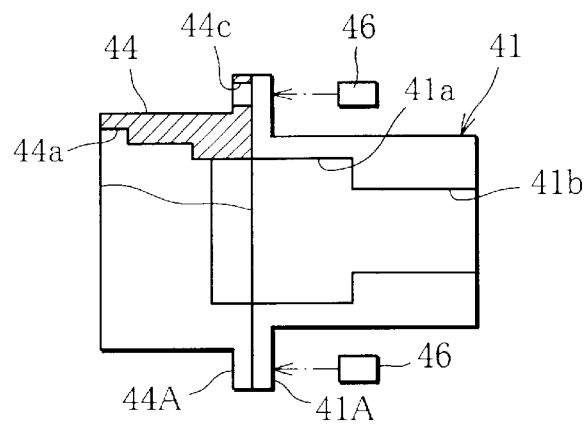
FIG. 17 is a schematic plan view showing a first housing mounted to the first connecting end member shown in FIG. 16 and showing a first receptacle mounted to the first housing.
Figure 18:
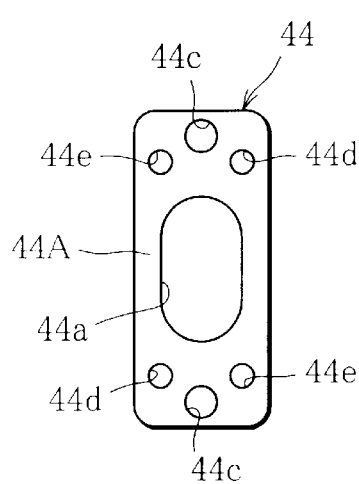
FIG. 18 is a schematic end view of the first receptacle.
Figure 19:
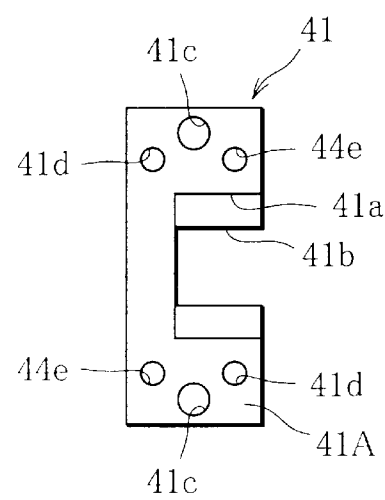
FIG. 19 is a schematic end view of the first housing.
Figure 20:
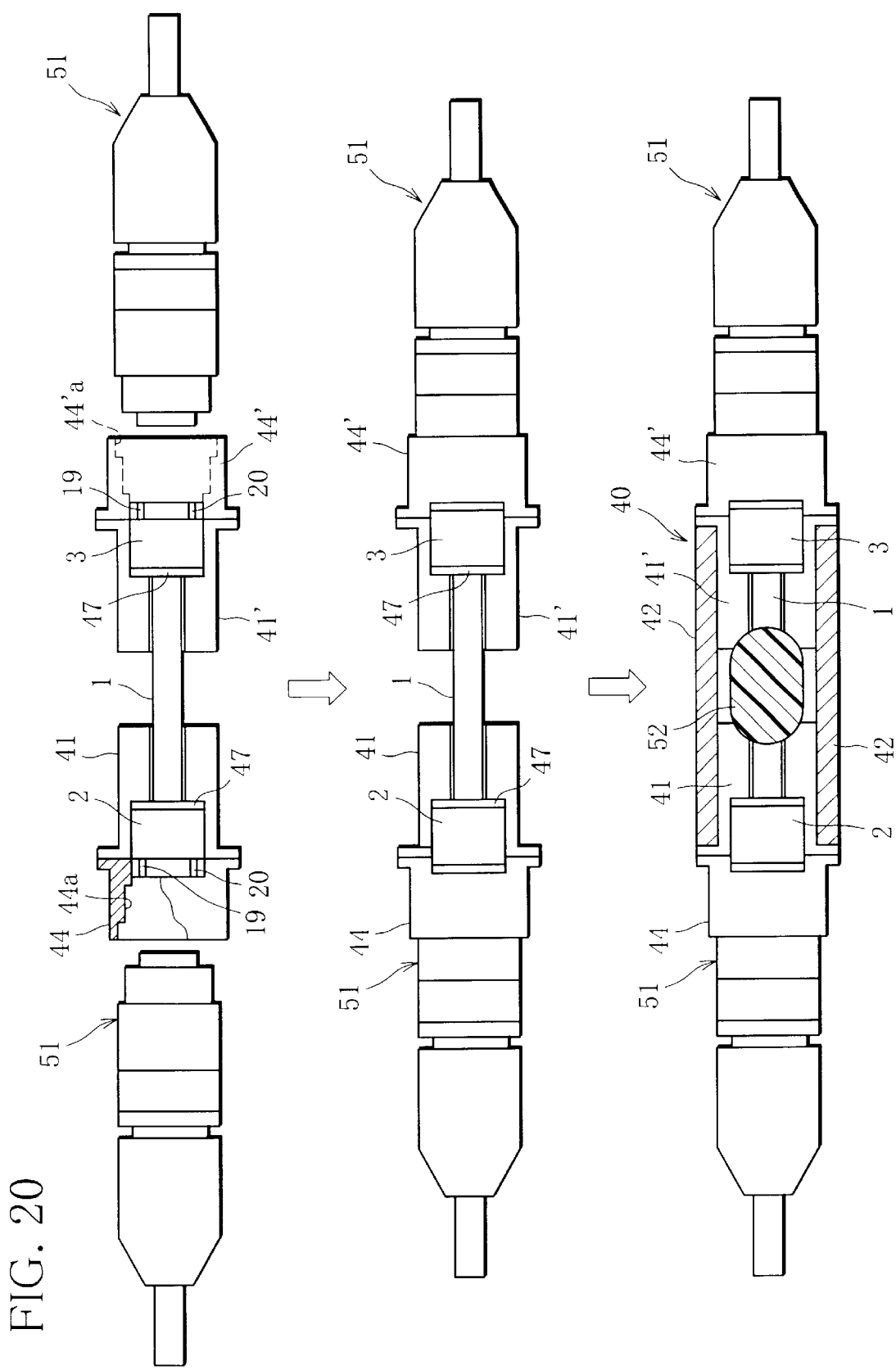
FIG. 20 is a schematic plan view showing the course of assemblage of the optical waveguide component shown in FIG. 6.

In the waveguide component 40 of the present embodiment, opposite end portions (input end and output end) of an optical waveguide chip (MT compatible PLC module) 1 are respectively received in recesses 16 of first and second connecting end members (MT compatible PLC ferrules) 2, 3 (see, FIG. 9). MT and PLC are abbreviations for "Mechanically Transferable" and "Planer Lightwave Circuit." At opposite end portions of the waveguide chip 1, an upper face and both side faces of the waveguide chip 1 are surrounded by the connecting end members 2 and 3. Opposite end faces of the waveguide chip 1 are exposed and flush with outer tip end faces of the connecting end members 2 and 3. Guide-pin fitting holes 12 and 13 are formed in both edge portions of each connecting end members 2 or 3 and extend longitudinally of the connecting end member. Guide pins 19 and 20 fitted in these holes 12 and 13 project from the tip end face of the connecting end member 2 or 3 associated therewith (see, FIG. 16). The guide pins 19 and 20 are arranged to be fitted into guide-pin accommodation holes 22 formed in optical connector plugs (MPO plugs) 23 respectively mounted to opposite end portions of the waveguide component 40 (see, FIG. 5). MPT is an abbreviation for "Mechanically Push-On."

The optical waveguide component 40 is provided with housings (PLC frames) 41, 41' serving as a protective member for protecting the waveguide chip 1 and each having a squared U-shaped transverse cross section, and upper plates 45, 45' for closing upper openings of the housings 41, 41'. The housing 41 and the upper plate 45 surround one end portion of the optical waveguide chip 1 and the connecting end member 2, and the housing 41' and the upper plate 45' surround another end portion of the optical waveguide chip 1 and the connecting end member 3.

More specifically, the housing 41 corresponding to the connecting end member 2 is comprised of a flange 41A and a housing body 41B integral therewith. The housing body 41B extends from an inner end face of the flange 41A to a position located short of a longitudinal center position of the optical waveguide chip 1. A connecting-end-member accommodating section 41a, having an open upper face and open end faces, is formed in the flange 41A and in an outer-end-side half of the housing body 41B. Further, a waveguide-chip accommodating section 41b, having an open upper face and open end faces, is formed in the other half of the housing body 41B. These accommodating sections 41a, 41b are in communication with each other. As viewed in plan, the accommodating section 41a is wider in width than the accommodating section 41b. The housing 41' corresponding to the connecting end member 3 is configured in the same manner as the housing 41. An upper plate 45', having an outer end face and a lower face thereof respectively disposed in contact with an inner end face of the flange 41' of the housing 41' and with an upper face of the connecting end member 3, covers the upper face of a corresponding one end portion of the waveguide chip 1. The upper plate 45' has its longitudinal length which is equal to or less than that of the housing body 41'B. The upper plate 45 is configured in the same manner as the upper plate 45' and is disposed similarly on the housing.

The housings 41, 41' and the upper plates 45, 45' are received in a protective cover 42 having a squared U-shaped transverse cross section, and an open upper face of the protective cover 42 is closed by a lid plate 43. The protective cover 42 and the lid plate 43 surround an intermediate portion of the waveguide chip 1. The protective cover 42 has opposite end faces thereof disposed in contact with opposite edge portions of the inner end faces of the flanges 41A, 41'A of the housings 41, 41'. The lid plate 43 is provided at its both ends with engaging portions 43a respectively adapted to be engaged with openings formed in the accommodating sections 41a, 41'a of the flanges 41A, 41'A. That is, the protective cover 42 and the lid plate 43 are held between the housings 41, 41'.

The waveguide component 40 is provided with first and second receptacles (input and output MPO receptacles) 44, 44' respectively disposed on the tip end sides of the housings 41, 41'. The receptacles 44, 44' are formed with connector-plug accommodation holes 44a, 44'a to which connector plugs 23 are fitted, respectively. The tip end portions of the guide pins 19, 20 provided in each connecting end member 2 or 3 project into the connector-plug accommodation hole 44a or 44'a. In the present embodiment, the first and second receptacles 44, 44' are mounted to the tip end faces of the housing bodies 41A, 41'A of the housings 41, 41'. More specifically, the flange 44A of the receptacle 44 is formed at its opposite edge portions with eyelet holes 44c extending through the flange 44. The receptacle 44 is formed at its tip end face with two engagement holes 44d and two engagement projections 44e. The housing body 41A of the housing 41 is formed with eyelet holes 41c extending therethrough, and has a tip end face thereof formed with two engagement projection 41d and two engagement holes 41e. In a state that the engagement holes 44d of the receptacle 44 are engaged with the engagement projections 41d of the housing 41 and that the engagement projections 44e of the receptacle 44 are engaged with the engagement holes 41e of the housing 41, the receptacle 44 is fixed to the housing 41 by press-fitting eyelets 46 into the eyelet holes 44c of the receptacle 44 and the eyelet holes 41c formed in the housing body 41A. Similarly, the receptacle 44' and the housing 41' are fixed together.

In the following, assembling processes of the waveguide component having the above construction will be explained.

First, as shown in FIGS. 3 and 4, the first and second connecting end members 2 and 3 are fitted to opposite end portions of the waveguide chip 1 after adhesive is applied, in the present embodiment, to either one or both of recess-defining faces of the connecting end members 2, 3 and the upper face and side faces of the opposite end portions of the waveguide chip 1. Then, the adhesive is hardened.

Next, pin-fixing members 47 are attached to inner end faces of the connecting end members 2, 3 mounted on the opposite end portions of the waveguide chip 1, respectively. Each pin-fixing member 47 is a squared inverted U-shape in transverse cross section, and permits the waveguide chip 1 to pass therethrough. The pin-fixing member 47 is provided at its both sides with leg portions in which guide-pin fixing portions are formed. For example, each guide-pin fixing portion includes a stepped hole comprised of a small-diameter portion permitting a shaft portion of a corresponding one of the guide pins 19, 20 to pass therethrough and a large-diameter portion for receiving a head of a screw, the screw being threadedly engaged with threads formed in an inner end portion of the guide pin. The stepped hole is formed at a location such that it is aligned with a corresponding one of guide-pin fitting holes 12, 13 of the connecting end member 2 or 3 when the pin-fixing member 47 is mounted to the connecting end member.

Then, the guide pins 19, 20 are inserted into guide-pin fitting holes 12, 13 of each connecting end member 2 or 3 from the outer-end-face side of the connecting end member, and the inner ends of the guide pins 19 and 20 are respectively fixed to the guide-pin fixing portions of the pin-fixing member 47 with use of screws.

Next, the engagement holes and engagement projections of the housings 41, 41' are engaged with engagement projections and engagement holes of the receptacles 44, 44', respectively, after adhesive is applied to either or both of the outer end faces of the housings 41, 41' and the inner end faces of the receptacles 44, 44'. Thereupon, eyelets 46 are pressed into eyelet holes formed in the housings 41, 41' and the receptacles 44, 44', to thereby fix the housings and the receptacles together.

Next, the housing 41 fixed with the first receptacle 44 and the housing 41' fixed with the second receptacle 44' are respectively mounted to opposite end portions of the waveguide chip and to the connecting end members 2, 3. More specifically, the connecting end members 2, 3 fixed to the opposite end portions of the waveguide chip 1 are respectively fitted into the connecting-end-member accommodating sections 41a, 41'a of the housings 41, 41', and an intermediate portion of the waveguide chip 1 is fitted into the waveguide-chip accommodating sections 41b, 41'b of the housings 41, 41'. Since the opposite end portions of the waveguide chip 1 and the connecting end members 2,3 are respectively fitted into the separate housings 41, 41', the waveguide chip and the connecting end members can be easily fitted to the housings even if there is a warp in the waveguide chip 1.

Whereupon, dummy MPO plugs 51 for assemblage are inserted into the input and output ends, i.e., the connector-plug accommodation holes 44a, 44'a of the receptacles 44, 44' of the waveguide component 40 which is half-finished in the above manner. At this time, there are appropriate clearances between the waveguide chip 1 to which the connecting end members 2, 3 are attached and the connecting end members 2, 3 to which the receptacles are fixed and which are mounted to the opposite end portions of the waveguide chip.

The dummy plugs 51 have the same shape and dimension as those of the connector plugs 23 and are formed with guide-pin accommodation holes. When the dummy plugs 51 are pressed into the connector-plug accommodation holes 44a, 44'a of the receptacles 44, 44', the dummy plugs 51 are smoothly inserted into the connector-plug accommodation holes 44a, 44'a in term of a guiding function of these holes. As the dummy plugs 51 are inserted deeply into the holes, the longitudinal axis of each dummy plug 51 is adequately coincide with that of the associated receptacle 44 or 44'. In a condition that the dummy plugs 51 are sufficiently pressed into the connector-plug accommodating holes 44a, 44'a, the guide-pin accommodation holes of the dummy plugs 51 are adequately aligned with the guide pins 19, 20 projecting from the tip end faces of the connecting end members 2, 3 into the connector-plug accommodation holes 44a, 44'a of the receptacles 44, 44'. Accordingly, the tip end faces of the dummy plugs 51 are brought in contact with the tip end faces of the waveguide chip 1 while permitting guide pins 19, 20 to be deeply inserted into the guide-pin accommodation holes of the dummy plugs. As the dummy plugs 51 are pressed into the connector-plug accommodation holes 44a, 44'a of the receptacles 44, 44' in this manner, the waveguide chip 1 and the connecting end members 2, 3 mounted on the opposite end portions of the chip are caused to slightly move in the housings 41, 41', where required. As a consequence, the positions of the waveguide chip 1 and the connecting end members 2, 3 in the housings 41, 41' are made proper, whereby the position and angle of the tip end faces (connecting faces) of the waveguide chip 1 are automatically adjusted.

Subsequently, upper plates 45, 45' are placed on and fixed, by means of adhesive, to the upper faces of the housing bodies 41A, 41'A and the upper faces of the connecting end members 2, 3 received in the housings 41, 41'. Then, the housings 41, 41' covered by the upper plates 45, 45' are received in the protective cover 42. The housings 41, 41' and the protective cover 42 are configured such that there are appropriate clearances therebetween. Whereupon, adhesive 52 is filled between the housings 41 and 41'. The waveguide chip 1, the connecting end members 2, 3 and the housings 41, 41' having been properly arranged in the above manner are fixed together within the protective cover 2 by means of adhesive 52. Finally, the lid plate 43 is fixed to the protective cover 42 by means of adhesive, with the upper opening of the protective cover 42 covered by the lid plate 43. After the adhesive 52 and other adhesive are hardened, the dummy plugs 51 are detached from the receptacles 44, 44'.

In the above manner, the optical waveguide component (MPO receptacle type PLC module) 40 is assembled, in which the positions and angles of the input and output end faces of the optical waveguide chip (MT compatible PLC module) 1 accommodated therein are adjusted for optimum fitting with optical connector plugs (MPO plugs) 23.

To connect the waveguide component 40 and optical fiber ribbons 21, tip end portions of optical connector plugs 23 are fitted into connector-plug accommodation holes 44a, 44'a of the receptacles 44, 44' of the waveguide component, and the connector plugs 23 are pressed into these holes. The connector plugs 23 smoothly move toward the connecting end members 2. 3 in the connector-plug accommodation holes, while being guided by the holes. As the connector plugs are inserted deeply into the connector-plug accommodation holes, the longitudinal axes of the connector plugs are brought to be more precisely aligned with those of the connecting end members, and guide-pin accommodation holes 22 of the connector plugs are satisfactorily aligned with guide pins 19, 20 projecting from tip end faces of the connecting and members 2, 3 into the connector-plug accommodation holes of the receptacles 44, 44'. Thus, the guide pins 19, 20 of the connecting end members 2, 3 can be accurately and easily inserted into the guide-pin accommodation holes of the connector plugs 23, whereby the optical fiber ribbons 21 are connected to the waveguide component 40 via the connector plugs 23. As a consequence, optical fibers in the optical fiber ribbons 21 are optically connected to optical waveguide formed in the waveguide chip 1 of the waveguide component 40 in a state that tip end faces of these optical fibers, having been subject to the adjustment by means of dummy plugs, are correctly aligned with both end faces of the waveguide.

The present invention is not limited to the foregoing embodiment, but may be modified variously.

For instance, although the waveguide component of the embodiment is arranged to be connected at its both ends (input and output ends) with optical fiber ribbons via optical connector plugs, the present invention is applicable to an optical waveguide component adapted to be connected at its one end with an optical fiber ribbon (multi-core optical fiber) or a single-core optical fiber or adapted to be connected at its both ends with single-core optical fibers. In the foregoing embodiment, a protective member for protecting an optical waveguide chip is comprised of two separate housings. Alternatively, a one-piece type housing may be employed.

What is claimed is:

1. An optical waveguide component to which an optical connector plug is connected using a guide pin, comprising:

an optical waveguide chip formed with an optical waveguide;

a connecting end member mounted on a tip end portion of said optical waveguide chip and having a guide-pin fitting hole, said connecting end member having a rectangular shaped cross section;

a protective member for protecting said optical waveguide chip; and a receptacle which is disposed on a tip end side of said protective member and to which the optical connector plug is connected, said receptacle having a rectangular shaped cross section.

2. The optical waveguide component according to claim 1, wherein said optical waveguide component comprises first and second connecting end members respectively mounted on opposite end portions of said optical waveguide chip and each having a guide-pin fitting hole, and first and second receptacles disposed on tip end sides of said protective member and to which first and second optical connector plugs are respectively connected.

3. The optical waveguide component according to claim 2, wherein protective members are provided at the opposite end portions of said optical waveguide chip independent of each other.

* * * * *